United States Patent [19]

Tatara et al.

[11] Patent Number: 5,334,097

[45] Date of Patent: Aug. 2, 1994

[54] TOROIDAL TYPE CONTINUOUSLY VARIABLE TRANSMISSION SUPPORTED BY A COMMON BEARING AND REACTION STATIONARY SHAFT

[75] Inventors: Yudai Tatara, Susono; Yasunobu Jufuku, Gotenba; Hisashi Machida; Hiroyuki Ito, both of Fujisawa, all of Japan

[73] Assignees: Toyota Jidosha Kabushiki Kaisha, Toyota; Nihon Seiko Kabushiki Kaisha, Tokyo, both of Japan

[21] Appl. No.: 223

[22] Filed: Jan. 4, 1993

[30] Foreign Application Priority Data

Jan. 7, 1992 [JP] Japan ................. 4-019491
Jan. 22, 1992 [JP] Japan ................. 4-032769

[51] Int. Cl.⁵ ............................................. F16H 15/16
[52] U.S. Cl. .............................. 476/8; 418/206; 476/10; 476/40
[58] Field of Search .............. 476/8, 10, 40, 42; 418/206

[56] References Cited

U.S. PATENT DOCUMENTS 2,962,909 12/1960 Jaquith et al. .............. 476/40 X
3,008,337 11/1961 Kraus .
3,165,937 1/1965 Tomaszek .
3,598,740 8/1971 Duling et al. .............. 476/8 X
3,810,398 5/1974 Kraus .
4,314,485 2/1982 Adams ................... 476/40 X
4,386,536 6/1983 Kraus ..................... 476/40 X
5,040,959 8/1991 Fukagawa ................ 418/206 X

FOREIGN PATENT DOCUMENTS 62-179458 11/1987 Japan .
2-47458 3/1990 Japan .

Primary Examiner—Allan D. Herrmann
Attorney, Agent, or Firm—Oblon, Spivak, McClelland, Maier & Neustadt

[57] ABSTRACT

In a toroidal type continuously variable transmission having an input disk, an output disk and power rollers sandwiched and frictionally engaged between the input and output disks so as to transmit rotational power therebetween at a transmission ratio variable according to the inclination of the power rollers relative to the input and output disks, a stationary shaft is provided as supported by a housing, and the input and output disks are rotatably supported by the stationary shaft via individual radial bearing means and individual axial bearing means. The stationary shaft has an axial bore and transverse orifices, and the bearings are lubricated by lubrication oil supplied through the axial bore and the transverse orifices.

12 Claims, 4 Drawing Sheets

TOROIDAL TYPE CONTINUOUSLY VARIABLE TRANSMISSION SUPPORTED BY A COMMON BEARING AND REACTION STATIONARY SHAFT

BACKGROUND OF THE INVENTION

1. Field of the Invention

The present invention relates to a toroidal type continuously variable transmission (referred to as T-CVT hereinbelow) which has an input disk, an output disk and power rollers sandwiched and frictionally engaged between the input and output disks and transmits rotational power between the input and output disks via the power rollers at a transmission ratio variable according to the inclination of the power rollers relative to the input and output disks.

2. Description of the Prior Art

In the T-CVT of the above-mentioned basic construction which itself is well known in the art, it is a general construction that the input disk is supported by an input shaft and the output shaft is journaled on the input shaft to be rotatable therearound. Such a general construction that the input and output disks are both commonly supported by the input shaft provides a T-CVT at a smaller size and a lower weight for the same power transmission capacity, by a smaller number of construction members, and therefore at a lower manufacturing cost, as compared with a T-CVT having input and output shafts supporting the input and output disks separately.

However, since the input disk and output disks of the T-CVT rotate in opposite directions relative to one another, when the output disk is journaled on the input shaft, the bearing means which supports the output disk on the input shaft is subjected to a very high rotation speed which is an addition of the rotation speed of the input disk and that of the output disk, and therefore the bearing means often suffers an early wearing. Further, on the other hand, since the input disk is generally rotatably supported on the input shaft via a bearing means so that the input disk is axially biased relative to the input shaft by a torque cam means which converts a part of the torque into an axial force based upon an angular shifting of the input disk relative to the input shaft, such a bearing is subjected to a very small rotation and generally suffers uneven wearing of the bearing surface.

SUMMARY OF THE INVENTION

In view of the above-mentioned problems in the conventional T-CVT, it is an object of the present invention to provide an improved T-CVT in which all of the bearing means incorporated therein are subjected to a uniform rotation, so that a uniform and thereby much less largest wearing occurs at any part of the bearing means incorporated therein.

It is also another object of the present invention to provide a T-CVT improved of its bearing performance as described above, with a further improvement of lubrication performance, as available by the construction which accomplishes the above-mentioned first object.

According to the present invention, the above-mentioned first object is accomplished by a toroidal type continuously variable transmission comprising an input disk, an output disk and power rollers sandwiched and frictionally engaged between said input and output disks so as to transmit rotational power therebetween at a transmission ratio variable according to an inclination of said power rollers relative to said input and output disks, wherein the improvement comprises:

a housing;

a stationary shaft mounted to said housing;

a first bearing means supporting said input disk radially around said stationary shaft so as to be rotatable coaxially therearound;

a second bearing means supporting said output disk radially around said stationary shaft so as to be rotatable coaxially therearound;

a third bearing means supporting said input disk relative to said stationary shaft against an axial thrust oriented away from said output disk, while allowing said input disk to rotate coaxially around said stationary shaft; and a fourth bearing means supporting said input disk relative to said stationary shaft against an axial thrust oriented away from said input disk, while allowing said output disk to rotate coaxially around said stationary shaft.

In the above-mentioned toroidal type continuously variable transmission, said third bearing means may be a radial-thrust bearing means, and said input disk may be axially supported from said third bearing means via a hollow shaft member which is torque-transmittingly connected with said input disk at a first end thereof and is radially and axially supported by said third bearing means at a second end thereof opposite to said first end thereof.

Further, said input disk may be torque-transmittingly connected with said first end of said hollow shaft member via a torque cam means which converts a part of a torque into an axial thrust force.

Further, a pulley may be torque-transmittingly connected with said second end of said hollow shaft member.

In the above-mentioned toroidal type continuously variable transmission, said fourth bearing means may be a radial-thrust bearing means, and said output disk may be axially supported from said fourth bearing means via a hollow shaft member which is radially and axially supported by said fourth bearing means at a first end thereof remote from said output disk and is torque-transmittingly engaged with said output disk, said hollow shaft member serving as a shaft to bear a rotary element to be rotationally driven at a variable speed by a rotational power input to said input disk.

In this case, said rotary member is a half of mating rotors of a Roots blower.

Further, said hollow shaft member may be formed with an annular shouldered portion facing toward said output disk at an intermediate portion thereof, and a gear wheel and an inner race member of a bearing means may be mounted on said hollow shaft member between said output disk and said shouldered portion, said inner race member being rotatably supported by an outer race member of said bearing means which is mounted in a housing of the Roots blower, said gear wheel meshing with a gear wheel adapted to drive another half the mating rotors of the Roots blower.

In the above-mentioned toroidal type continuously variable transmission, said third bearing means may be supported from said stationary shaft via a nut means mounted at a threaded end portion of said stationary shaft.

In the above-mentioned toroidal type continuously variable transmission, said stationary shaft may have an axial bore through an axial portion engaging with said first and second bearing means, and transverse orifices substantially radially traversing an annular wall of said stationary shaft around said axial bore, and the transmission may further comprise a lubrication oil supply system for supplying lubrication oil into said axial bore so that the lubrication oil flows out therefrom through said transverse orifices toward said first and second bearing means.

In this case, said lubrication oil supply system may comprise a conduit means substantially radially traversing a space left between said input and output disks and said power rollers to conduct the lubrication oil into said axial bore of said stationary shaft, said conduit means having at least one transverse orifice for spraying a part of the lubrication oil conducted through said conduit means toward a toroidal surface of said input or output disk.

BRIEF DESCRIPTION OF THE DRAWING

In the accompanying drawing.

DESCRIPTION OF THE PREFERRED EMBODIMENT

In the following the present invention will be described in more detail with respect to an embodiment thereof with reference to the accompanying drawings.

Figure 1:
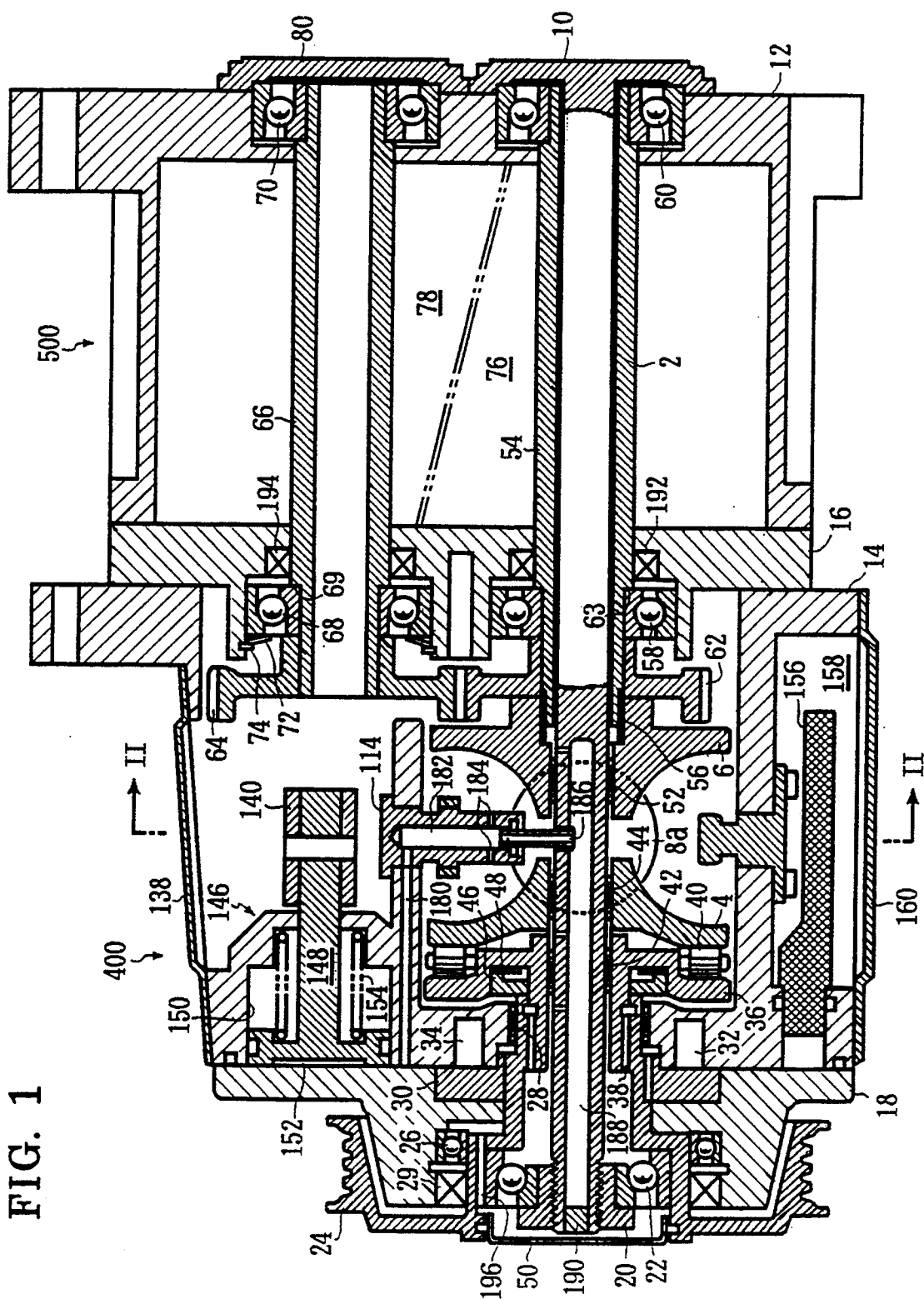
FIG. 1 is a view showing a longitudinal section of an embodiment of a T-CVT according to the present invention, combined with a Roots blower to drive it at a variable speed.
Figure 2:
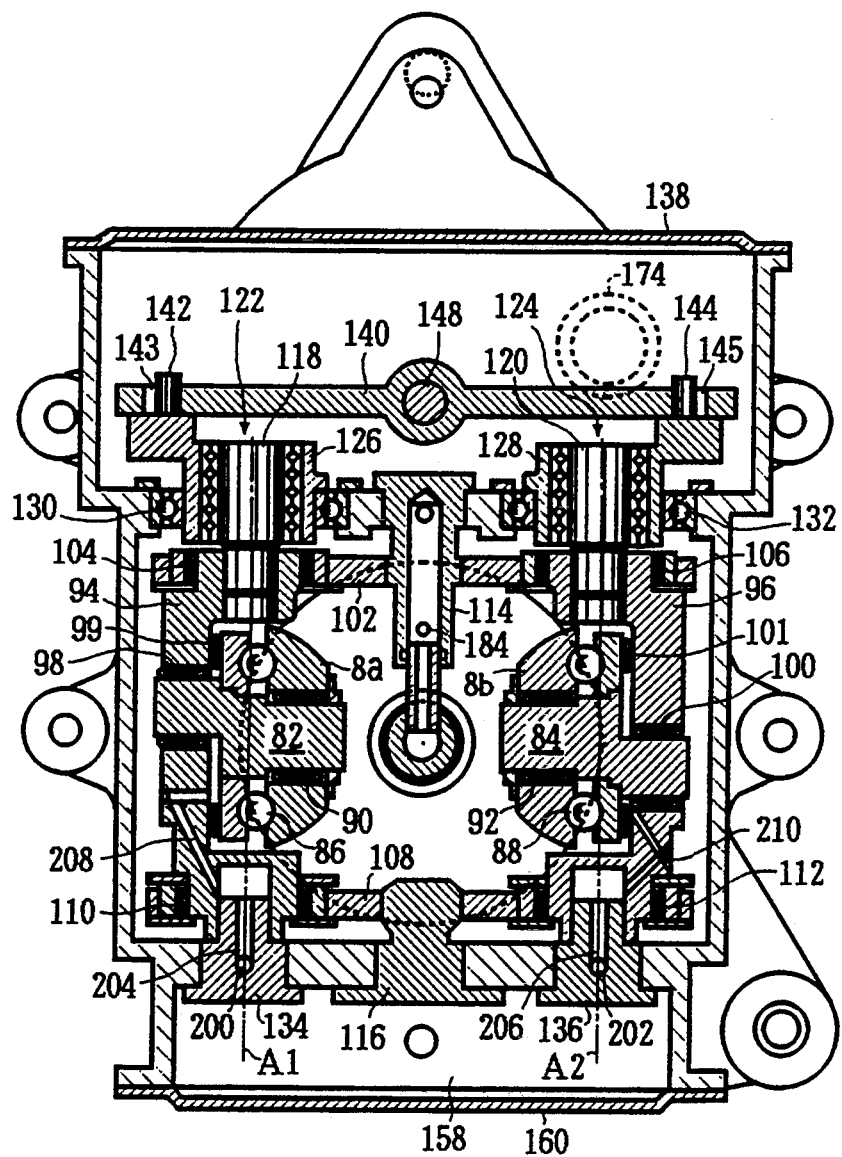
FIG. 2 is a view showing a cross section of the T-CVT shown in FIG. 1, the section being taken along line II—II in FIG. 1.
Figure 3:
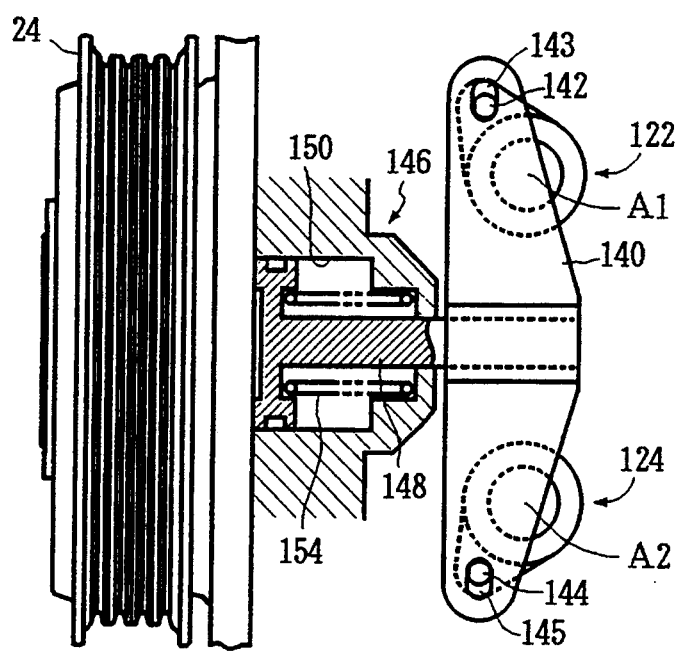
FIG. 3 is a partial view showing principally a part of the power roller control means in the T-CVT shown in FIG. 1, as viewed from the top of the T-CVT.

Referring to FIGS. 1-3 in combination, in which corresponding portions are designated by the same reference numerals, 400 generally designates a T-CVT part and 500 generally designates a Roots blower type supercharger part, both integrally combined to provide a continuously variable speed Roots blower type supercharger device.

The T-CVT 400 comprises a stationary shaft 2 disposed to extend through the length of the combination device, around which are mounted an input disk 4 and an output disk 6, as located at a central portion of the T-CVT. A pair of power rollers 8a and 8b are disposed between the input disk 4 and the output disk 6 as sandwiched and frictionally engaged therebetween, thereby providing the basic construction of T-CVT which itself is well known in the art. An example of such a T-CVT is shown in, for example, Japanese Patent Laid-open Publication 58-160664. The stationary shaft 2 has a retainer portion 10 formed integrally therewith which is fastened to a housing 12 of the Roots blower by appropriate fastening means not particularly shown in the figure. The housing 12 is assembled with a housing 14 of T-CVT with interposition of an intermediate wall member 16 so as thereby to construct an overall housing body of the continuously variable speed Roots blower type supercharger device. The left side end of the housing body as viewed in FIG. 1 is open in its construction but is closed by a front cover 18 fastened thereto by appropriate fastening means not particularly shown in the figure.

An end portion of the stationary shaft 2 remote from the retainer 10 is formed with a screw thread and bears a nut 20 screwed therearound. The nut 20 supports a radial-thrust ball bearing 22 (third bearing means therearound, which in turn supports a pulley 24 at a hub portion thereof to be rotatable around its axis. The ball bearing 22 also axially supports the nut 20, and therefore the pulley 24, against a leftward shifting relative to the stationary shaft 2 as viewed in FIG. 1. The pulley 24 serves as a rotation power input member of the supercharger device. The pulley 24 is also rotatably supported at an outer peripheral surface of the hub portion from the front cover 18 via a ball bearing 26 and is further rotatably supported at an inner end portion thereof from the T-CVT housing 14 via a needle bearing 28. The ball bearing 26 is sealed off from the outside of the front cover 18 by an oil seal means 29.

Along the border between the T-CVT housing 14 and the front cover 18 there is incorporated an oil pump 30 which serves as a source of hydraulic pressure for operating a power roller control means described in detail hereinbelow and also supplying lubrication oil to various locations of the device also described in detail hereinbelow. The oil pump 30 is directly driven by the hub portion of the pulley 24 when a rotary power is input to the pulley 24, so as to take in oil through an intake port 32 and to deliver the oil at an elevated pressure through a delivery port 34.

The rotary power input to the pulley 24 is transmitted to a cam race 36 through splines 38 (on a member which, together with the cam race 36, forms a hollow shaft member) which constructs a torque cam means together with cam elements 40 which converts a part of the torque input to the cam race 36 into an axial force for thrusting the input disk 4 rightward in FIG. 1 relative to the stationary shaft 2. A cam race of the torque cam means on the input disk side is directly provided by the body of the input disk 4, and the conversion of a torque to a thrust force is effected by an angular relative shifting between the cam race 36 and the input disk 4. The cam race 36 is rotatably supported on the stationary shaft 2 via a needle bearing 42. The input disk 4 is rotatably supported on the stationary shaft 2 via a needle bearing 44 (first bearing means). An annular spacer 46 and a spring washer 48 are disposed in combination between the cam race 36 and the hub portion of the pulley 24, wherein the spring washer 48 exerts an initial axial force to the cam race 36 as well as to the input disk 4. The initial axial force is adjusted by the degree of clamping of the nut 20 on the stationary shaft 2. An open outside end of the hub portion of the pulley 24 is closed by a cover member 50. The third bearing means 22 is a radial thrust bearing means, and the input disk 4 is axially supported from the third bearing means 22 via the hollow shaft member which is torque transmittingly connected with the input disk at the first end thereof, i.e., the end formed by the cam race 36, and is radially and axially supported by the third bearing means 22 at the end thereof opposite the first end.

The output disk 6 is rotatably supported on the stationary shaft 2 via a needle bearing 52 (second bearing means). The output disk 6 is torque-transmittingly connected with a hollow shaft 54 through splines 56 which are arranged around the stationary shaft 2 to be co-axially rotatable therearound and is rotatably supported from the supercharger housing via ball bearings 58 and ball bearings 60 (fourth bear means). The ball bearing 60 is particularly constructed to be a radial-thrust bearing to support the hollow shaft 54 against a rightward axial shifting relative to the stationary shaft 2 as viewed in FIG. 1. In the shown embodiment, the outer race of the bearing 60 is axially supported by the retainer portion 10 formed integrally with the stationary shaft 2. The fourth bearing means 60 is a radial thrust bearing and the output disk 6 is axially supported from the fourth bearing means 60 via the hollow shaft 54 which is radially and axially supported by the fourth bearing means 60 at a first end thereof remote from the output disk 6, and is torque transmittingly engaged with the output disk 6.

Around a left end portion of the hollow shaft 54 as viewed in FIG. 1 where the outer diameter of the stationary shaft 2 is reduced there is press-fitted a hub portion of a gear wheel 62 to hold an inner race of the ball bearing 58 with an annular shoulder edge 63 therebetween, so that the fitting is tight enough to transmit the torque required to be transmitted to the gear wheel 62 and to a gear wheel 64 meshing therewith. The gear wheel 64 has the same number of gear teeth as the gear wheel 62 and is press-fitted around a reduced left end portion of a hollow shaft 66 as viewed in FIG. 1, holding an inner race of a ball bearing 68 with an annular shoulder edge 69 in the hollow shaft 66 therebetween. The hollow shaft 66, which is made hollow to decrease its weight relative to the structural firmness thereof and may be a solid shaft if desired, is rotatably supported from the supercharger housing via the roller bearing 68 and another roller bearing 70, both being constructed to be a radial-thrust bearing. The ball bearing 68 is held in its position under an initial axial force applied by a spring washer 72 held around a bearing opening of the supercharger housing by a snap ring 74.

The hollow shafts 54 and 66 bear rotors 76 and 78 which rotate around respective central axes in opposite rotational directions with respect to one another, so as to construct the Roots blower 500. The roller bearing 70 is sealed off by a cover 80 fastened to the supercharger housing by appropriate fastening means not shown in the figure. No further detailed construction of the Roots blower is shown in the figure, since the construction of the Roots blower other than the shafts 54 and 66 is not concerned with the present invention.

In the above-mentioned construction, a rotational power supplied to the pulley 24 from a crankshaft of an engine not shown in the figure is transmitted to the input disk 4 through the torque cam mechanism including the cam race 36 and the cam elements 40 to rotate the input disk 4 in a first rotational direction. The rotational power is then transmitted through a corresponding rotation of the power rollers 8a and 8b to the output disk 6 which rotates in a second rotational direction opposite to said first rotational direction, thereby driving the hollow shaft 54 in said second rotational direction, while also driving the hollow shaft 66 in said first rotational direction, so as to operate the Roots blower 500 via the T-CVT 400.

During the rotational power transmitting operation of the T-CVT 400, the axial force required to press the input disk 4 and the output disk 6 together against the power rollers 8a and 8b sandwiched therebetween to ensure the friction power transmitting engagement between the input disk 4 and the power rollers 8a, 8b and between the power rollers 8a, 8b and the output roller 6 is generated by the torque cam mechanism including the cam race 36 and the cam elements 40, as axially supported by the stationary shaft 2 which serves as a common reaction member for axially supporting the input disk 4 and the output disk 6 from the opposite ends thereof via the radial-thrust type roller bearings 22 and 60. In this case, the ball bearing 22 and 60 are both subjected to the same rotation speed, although opposite in the rotational direction, whereby the wearing, if inevitable, occurs uniformly in both the bearings 22 and 60. Similarly, the needle bearings 44 and 52 supporting the input disk 4 and the output disk 6 respectively around the stationary shaft 2 are both subjected to the same rotation speed, although again opposite in the rotational direction, whereby the wearing, if inevitable, occurs uniformly in both the bearings 44 and 52.

The inclination of the power rollers 8a and 8b relative to the input disk 4 and the output disk 6 is controlled by a transmission ratio control means so as to continuously change the transmission ratio of the rotational power between the input disk 4 and the output disk 6. The power roller 8a and 8b are supported by shafts 82 and 84, ball bearings 86 and 88, and needle bearings 90 and 92 to be rotatable around each central axis thereof, while the shafts are each supported by trunnion 94 and 96 via needle bearings 98, 99, 100 and 101 to be rotatable around an axis shifted from the central axis of the corresponding power roller, respectively. The trunnion 94 and 96 are supported at upper ends thereof from an upper link 102 via bearings 104 and 106 and at lower ends thereof from a lower link 108 via bearings 110 and 112 to be rotatable around vertical axes A1 and A2 each intersecting the central axis of the corresponding power roller. The trunnion 94 and 96 and the upper and lower links 102 and 108 form a parallelogrammic frame structure.

The upper and lower links 102 and 108 are supported from the T-CVT housing 14 via an upper post 114 and a lower post 116, respectively. Stud members 118 and 120 of ball coupling assemblies 122 and 124 are press-fitted into upper end bores of the trunnion 94 and 96, respectively. Ring members 126 and 128 of the ball coupling assemblies 122 and 124 are supported from the T-CVT housing 14 via ball bearings 130 and 132, respectively. The lower ends of the trunnion 94 and 96 are aligned along the axes A1 and A2 by side posts 134 and 136 mounted to engage corresponding bores formed in the T-CVT housing 14 and lower end bores of the trunnion, respectively.

When the ring members 126 and 128 are turned around the axes A1 and A2, respectively, the trunnion 94 and 96 are turned around the axes A1 and A2, respectively, so as thereby to turn the power rollers 8a and 8b around the axes A1 and A2, respectively. As the power rollers 8a and 8b are turned around the axes A1 and A2, respectively, the inclination of the power rollers 8a and 8b relative to the input and output disks 4 and 6 are changed, so that the radius of the friction contact points between the power rollers 8a and 8b and the input and output disks 4 and 6 change, resulting in a corresponding change of the transmission ratio between the input disk 4 and the output disk 6. 138 is an upper cover which closes an upper opening of the T-CVT housing 14.

The ring members 126 and 128 are connected with an arm member 140 at pins 142 and 144 carried thereby as shifted from the centers thereof aligning with the axes A1 and A2, respectively, wherein the pins 142 and 144 are received in oval openings 143 and 145, respectively, formed in the arm member 140. The arm member 140 is supported from a hydraulic actuator 146 via its piston 148 thereof slidably received in a cylinder 150 thereof. When a hydraulic fluid is supplied into a hydraulic chamber 152, the piston 148 is shifted rightward in FIG. 1 or 3 against a biasing force applied by a compression coil spring 154, whereby the power rollers 8a and 8b are turned around the axes A1 and A2 clockwise and anticlockwise as viewed in FIG. 3, respectively, resulting in an increase of the reduction ratio of the T-CVT 400. Conversely, when the piston 148 is shifted leftward as viewed in FIG. 1 or 3 under the biasing action of the compression coil spring 154, the power rollers 8a and 8b are turned around the axes A1 and A2 anti-clockwise and clockwise as viewed in FIG. 3, respectively, resulting in a decrease of the reduction ratio of the T-CVT 400.

A hydraulic system for operating the hydraulic actuator 146 is principally incorporated in a front portion of the T-CVT housing 14 to includes the oil pump 30, control valves described in detail hereinbelow, an oil strainer 156 located in an oil reservoir chamber 158 provided by an oil pan 160, etc.

Figure 4:
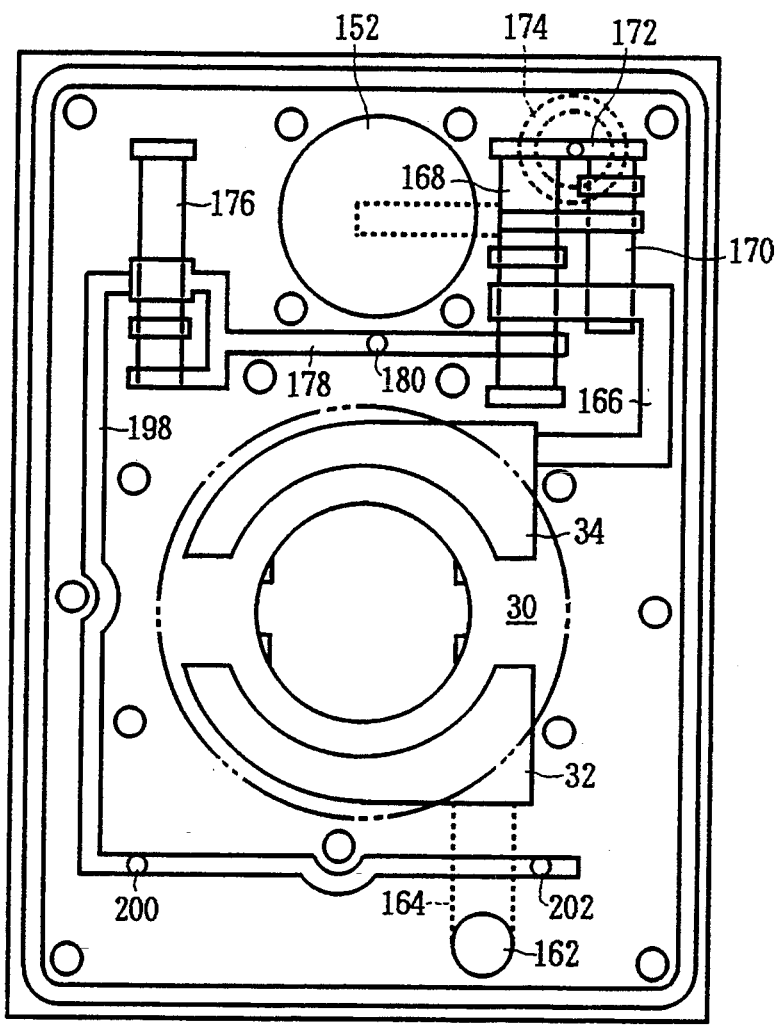
FIG. 4 is a generally diagrammatical view corresponding to a cross section of the T-CVT shown in FIG. 1, illustrating a hydraulic and lubrication system thereof.

Now also referring to FIG. 4, the oil reserved in the oil reservoir chamber 158 is pumped up by the oil pump 30 through the oil strainer 156 and intake passages 162 and 164 toward the intake port 32. The pressure oil delivered from the delivery port 34 is conducted through a passage 166 to a primary regulator valve 168 and a flow control valve 170. The primary regulator valve 168 regulates the pressure of the oil to a determinate pressure, while the flow control valve 170 controls the supply of the regulated pressure oil to the hydraulic chamber 152 according to a selection among three modes such that whether the oil is supplied to the hydraulic chamber 152, or the oil is exhausted from the hydraulic chamber 152, or the oil is neither supplied to nor exhausted from the hydraulic chamber 152.

Figure 5:
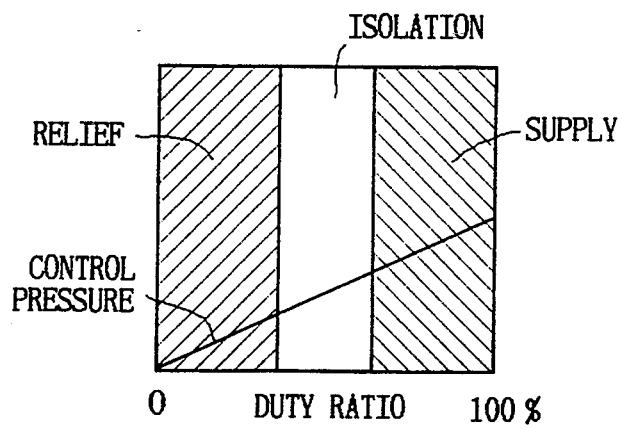
FIG. 5 is a graph showing the operation of the hydraulic system in controlling the inclination of the power rollers of the T-CVT shown in FIG. 1.

The primary regulator valve 168 and the flow control valve 170 are connected by a control passage 172. A duty valve 174 is provided behind the primary regulator valve 168 and the flow control valve 170 as viewed in FIG. 4, to control the oil pressure in the control passage 172. The duty valve 174 is actuated by an electric pulse signal, so as to control the oil pressure in the control passage 172 according to the duty ratio of the electric pulse signal. When the oil pressure in the control passage 172 is higher than a first threshold value, the flow control valve 170 is shifted in a first direction so far as to connect the hydraulic chamber 152 to the regulated oil pressure source provided by the primary regulator valve 168, whereas when the oil pressure in the control passage 172 is lower than a second threshold value lower than said first threshold value, the flow control valve 170 is shifted in a second direction opposite to said first direction so far as to connect the hydraulic chamber 152 to a relief passage. When the oil pressure in the control passage 172 is not higher than said first threshold value and not lower than said second threshold value, the flow control valve 170 isolates the hydraulic chamber 152 from both the regulated pressure source and the relief passage. Such a control operation for the hydraulic chamber 152 is shown in FIG. 5, wherein the relation between the supply, isolation and relief of oil and the control pressure as well as the relation between the control pressure and the duty ratio of the electric pulse signal are set out in a graph in combination.

The relief passage of the primary regulator valve 168 is connected to a secondary regulator valve 176 through a passage 178 which regulates the pressure of relief oil at a pressure level for lubrication. The oil regulated at the lubrication pressure is conducted through a passage 180 to the upper post 114, and further through a passage 182 in the upper post, and is partially sprayed onto the toroidal surfaces of the input and output disks 4 and 6 through orifices 184.

The oil flows further through a passage 186 into a central bore 188 formed in the stationary shaft 2, and flows out through several transverse orifices (no reference numerals are attached because of the lack of drawing space) formed in the stationary shaft 2 to lubricate the bearings 22, 42, 44 and 52, the splines 38 and 56, and the torque cam elements 40. The left hand end in FIG. 1 of the central bore 188 of the stationary shaft 2 is closed by a plug 190. The oil splayed onto the toroidal surfaces of the input and output disks 4 and 6 reaches further to the gear wheels 62 and 64 and the bearings 58 and 68 to lubricate them. The right hand sides in FIG. 1 of the bearings 58 and 68 are sealed off by sealing means 192 and 194. The oil which has passed through the bearing 22 further flows through a passage 196 to lubricate the bearing 26, and then returned to the oil reservoir space 158 through a passage not shown in the figure.

The oil controlled at the lubrication pressure by the secondary regulator valve 176 is also conducted through a passage 198 to ports 200 and 202 and then to passages 204 and 206 formed in the side posts 134 and 136, respectively. The oil is then conducted through passages 208 and 210 toward the bearings 98, 99, 100 and 101 of the power rollers 8a and 8b to lubricate them. The oil is then returned to the oil reservoir chamber 158.

As will be appreciated from the foregoing descriptions, the input and output disks 4 and 6 are supported by the stationary shaft 2 which serves as a shaft for radially supporting the input and output disks of the T-CVT to rotate therearound via respective radial bearings at the same rotational speed (same in absolute value) relative thereto and also serves as a common reaction member for axially supporting the input and output disks of the T-CVT via respective thrust bearings against the axial force required to maintain the friction engagement between the input and output disks and the power rollers, thereby rendering both the radial and thrust bearing for the input and output disks subjected to a substantially uniform rotation (except the difference corresponding to the transmission ratio). Thus, the wearing, if inevitably caused in the bearings, is uniformalized for all bearing with no peak and too early life limiting wearing being caused in any particular one due to unbalanced rotation in various bearings.

Further, since the axial reaction force is supported by a single and common stationary shaft member, the friction engagement between the input and output disks and the power rollers is highly stabilized thereby to provide a stable variable speed transmission.

Still further, a definite lubrication oil flow system is available by a single pressure oil source for both the friction engagement surfaces of the input and output disks and the power rollers and the bearing means at high reliability such that the distribution of lubrication oil between the two purposes is adjustable at high accuracy and stability by utilizing the stationary shaft as a means for providing a lubrication oil flow passage extended to penetrate the central region of the essential construction of the T-CVT.

Although the invention has been described in detail with respect to a particular embodiment thereof, it will be apparent for those skilled in the art that various changes and/or adding or subtracting modifications are possible with respect to the shown embodiment without departing from the spirit of the present invention.

We claim:

1. A toroidal type continuously variable transmission comprising an input disk, an output disk and power rollers sandwiched and frictionally engaged between said input and output disks so as to transmit rotational power therebetween at a transmission ratio variable according to an inclination of said power rollers relative to said input and output disks, wherein the improvement comprises:
   a housing;
   a stationary shaft mounted to said housing;
   a first bearing means supporting said input disk radially around said stationary shaft so as to be rotatable coaxially therearound;
   a second bearing means supporting said output disk radially around said stationary shaft so as to be rotatable coaxially therearound;
   a third bearing means supporting said input disk relative to said stationary shaft against an axial thrust oriented away from said output disk, while allowing said input disk to rotate coaxially around said stationary shaft; and
   a fourth bearing means supporting said input disk relative to said stationary shaft against an axial thrust oriented away from said input disk, while allowing said output disk to rotate coaxially around said stationary shaft,
   wherein said third bearing means is a radial-thrust bearing means, and said input disk is axially supported from said third bearing means via a hollow shaft member which is torque-transmittingly connected with said input disk at a first end thereof and is radially and axially supported by said third bearing means at a second end thereof opposite to said first end thereof.

2. A toroidal type continuously variable transmission according to claim 1, wherein said input disk is torque-transmittingly connected with said first end of said hollow shaft member via a torque cam means which converts a part of a torque into an axial thrust force.

3. A toroidal type continuously variable transmission according to claim 2, wherein a pulley is torque-transmittingly connected with said second end of said hollow shaft member.

4. A toroidal type continuously variable transmission according to claim 1, wherein said third bearing means is supported from said stationary shaft via a nut means mounted at a threaded end portion of said stationary shaft.

5. A toroidal type continuously variable transmission according to claim 1, wherein said stationary shaft has an axial bore through an axial portion engaging with said first and second bearing means, and transverse orifices substantially radially traversing an annular wall of said stationary shaft around said axial bore, further comprising a lubrication oil supply system for supplying lubrication oil into said axial bore so that the lubrication oil flows out therefrom through said transverse orifices toward said first and second bearing means.

6. A toroidal type continuously variable transmission according to claim 5, wherein said lubrication oil supply system comprises a conduit means substantially radially traversing a space left between said input and output disks and said power rollers to conduct the lubrication oil into said axial bore of said stationary shaft, said conduit means having at least one transverse orifice for spraying a part of the lubrication oil conducted through said conduit means toward a toroidal surface of said input or output disk.

7. A toroidal type continuously variable transmission comprising an input disk, an output disk and power rollers sandwiched and frictionally engaged between said input and output disks so as to transmit rotational power therebetween at a transmission ratio variable according to an inclination of said power rollers relative to said input and output disks, wherein the improvement comprises:
   a housing;
   a stationary shaft mounted to said housing;
   a first bearing means supporting said input disk radially around said stationary shaft so as to be rotatable coaxially therearound;
   a second bearing means supporting said output disk radially around said stationary shaft so as to be rotatable coaxially therearound;
   a third bearing means supporting said input disk relative to said stationary shaft against an axial thrust oriented away from said output disk, while allowing said input disk to rotate coaxially around said stationary shaft; and
   a fourth bearing means supporting said input disk relative to said stationary shaft against an axial thrust oriented away from said input disk, while allowing said output disk to rotate coaxially around said stationary shaft,
   wherein said fourth bearing means is a radial-thrust bearing means, and said output disk is axially supported from said fourth bearing means via a hollow shaft member which is radially and axially supported by said fourth bearing means at a first end thereof remote from said output disk and is torque-transmittingly engaged with said output disk, said hollow shaft member serving as a shaft to bear a rotary element to be rotationally driven at a variable speed by a rotational power input to said input disk.

8. A toroidal type continuously variable transmission according to claim 7, wherein said rotary member is a half of mating rotors of a Roots blower.

9. A toroidal type continuously variable transmission according to claim 8, wherein said hollow shaft member is formed with an annular shouldered portion facing toward said output disk at an intermediate portion thereof, and a gear wheel and an inner race member of a bearing means are mounted on said hollow shaft member between said output disk and said shouldered portion, said inner race member being rotatably supported by an outer race member of said bearing means which is mounted in a housing of the Roots blower, said gear wheel meshing with a gear wheel adapted to drive another half the mating rotors of the Roots lower.

10. A toroidal type continuously variable transmission according to claim 7, wherein said third bearing means is supported from said stationary shaft via a nut means mounted at a threaded end portion of said stationary shaft.

11. A toroidal type continuously variable transmission according to claim 7, wherein said stationary shaft has an axial bore through an axial portion engaging with said first and second bearing means, and transverse orifices substantially radially traversing an annular wall of said stationary shaft around said axial bore, further comprising a lubrication oil supply system for supplying lubrication oil into said axial bore so that the lubrication oil flows out therefrom through said transverse orifices toward said first and second bearing means.

12. A toroidal type continuously variable transmission according to claim 11, wherein said lubrication oil supply system comprises a conduit means substantially radially traversing a space left between said input and output disks and said power rollers to conduct the lubrication oil into said axial bore of said stationary shaft, said conduit means having at least one transverse orifice for spraying a part of the lubrication oil conducted through said conduit means toward a toroidal surface of said input or output disk.

* * * * *